United States Patent
Hall et al.

[19]

[11] Patent Number: 6,141,062
[45] Date of Patent: Oct. 31, 2000

[54] METHOD AND APPARATUS FOR COMBINING VIDEO STREAMS

[75] Inventors: Oswin Hall, Markam; Marinko Karanovic, Don Mills, both of Canada

[73] Assignee: ATI Technologies, Inc., Thornhill, Canada

[21] Appl. No.: 09/088,316

[22] Filed: Jun. 1, 1998

[51] Int. Cl.[7] .............................. H04N 9/74; H04N 5/45
[52] U.S. Cl. ..................... 348/584; 348/598; 348/565
[58] Field of Search ...................... 348/578, 584, 348/585, 588, 598, 599, 563, 564, 565, 705; H04N 5/445, 5/45, 9/74, 9/76

[56] References Cited

U.S. PATENT DOCUMENTS 5,559,562  9/1996  Ferster ................................ 348/584
5,675,393  10/1997  Chida ................................. 348/598

*Primary Examiner*—Sherrie Hsia
*Attorney, Agent, or Firm*—Markison & Reckamp, P.C.

[57] ABSTRACT

A method and apparatus that combines video streams to reduce interconnection between video processors and rendering devices is presented. Multiple video streams are multiplexed at particular phases of a clock signal so that, at the rendering device, the desired video stream is selected by selecting the appropriate phased clock signal. In a preferred embodiment, the combined signal is compatible with conventional single-port rendering devices, such as displays, video recorders, and video encoders. Also presented is a means for selecting among multiple video streams that minimizes the number of interconnections that are switched.

20 Claims, 7 Drawing Sheets

FIG. 1 [Prior Art]

METHOD AND APPARATUS FOR COMBINING VIDEO STREAMS

FIELD OF THE INVENTION

This invention relates generally to the field of video processing systems, and in particular to a system that processes multiple streams of video data.

BACKGROUND OF THE INVENTION

Computer systems and television systems often simultaneously display images from two video sources. For example, a computer system may display a motion picture in one window, while presenting a control panel to control the display of the motion picture in another window. Televisions display images from two channels at the same time, as a picture-in-picture.

Standards, such as ITU-R-656, have been developed to allow for display devices to be interconnected. A device that renders a single image will have one input port, a device that can render two images will have two input ports, and so on. These same standards are used to interconnect other devices, such as video storage devices, video encoders, and the like, as shown in FIG. 1. For ease of discussion, the term rendering device is used herein to refer to any device that accepts video data that is suitable for rendering on a display. Shown in FIG. 1 is a video processor 100 that receives inputs from two video sources, Vid A 102 and Vid B 104, and produces, therefrom, two decoded outputs 112, 114. The video sources 102, 104 may be, for example, an MPEG stream and a conventional television signal, such as NTSC, PAL, or SECAM. The decoders 120, 140 convert the video sources 102, 104 into a digital form that is suitable for rendering systems such as displays 150 and 156, as well as a storage unit 152, or other processing devices such as an MPEG, PAL, or NTSC encoder 154. The display 150 displays images from multiple sources, as shown by the connection of decoded outputs 112, 114 to the multiple inputs of the display 150. Each decoded output 112, 114 has an associated clock signal 113, 115, respectively, for controlling the display of the images associated with each of the decoded output signals. The decoding of signals from varying sources can occur at differing frequencies. For example, MPEG decoding conventionally produces decoded output at a frequency of 27 MHz; television decoding produces outputs at approximately 28 MHz, 36 MHz, and other frequencies, depending on the format used to encode the video streams. These frequencies produce the appropriate number of data values for a display of each image frame at the appropriate frame rate.

The advantage of a standard interconnection scheme is that any device that conforms to the standard can be interconnected with any other device that also conforms to the standard. In FIG. 1, for example, by using a standard based upon a single-port configuration, devices 152, 154 that receive a single video input and a device 150 that receives multiple video inputs are compatibly interconnected to a video processor 100 that provides multiple video outputs.

As can be seen in FIG. 1, the interconnection among the devices in a single-port configuration requires a separate connection for each decoded output 112, 114. Typically, the connections contain multiple parallel data lines. For example, ITU-R-656 calls for 8 data lines for each port. The video processor 100 in this example requires 16 data lines, as does the video display device 150. If more than two video sources are decoded, 8 data lines are required for each port. This multiplicative effect is particularly problematic when multiple decoders are integrated into a single integrated circuit, because the number of pins required for an integrated circuit has a direct impact on manufacturing costs and reliability.

Another problem with the use of individual ports for each decoded output is the complexity of interconnection. The single port devices 152 and 154 are directly connected to one of either output ports 112, or 114, exclusively. A rewiring of the interconnections to the video processor is required to allow, for example, the video encoding device 154 to receive the decoded signal 112 corresponding to Vid A 102. Alternatively, the rendering device 156 is interconnected via a switch 170 to either output ports 112, 114, to allow for ease of switching. Note, however, that switch 170 requires the switching of 8 data lines and a clock line to each of the available output ports 112, 114 and their associated clocks 113, 115. Again, this multiplicative effect is particularly problematic for integrated circuit based designs, as well as for systems designed for multiple video source processing, such as studio systems.

Therefore, a need exists for a method and apparatus for combining video streams that minimizes the number of interconnections required between devices, while also providing for compatibility among devices of varying capabilities.

DETAILED DESCRIPTION OF THE PREFERRED EMBODIMENT

Generally, the present invention provides a method and apparatus that combines video streams to reduce interconnection requirements. Multiple video streams are multiplexed in such a manner that each of the individual streams is synchronized with a particular phase of a clock signal. In a preferred embodiment, the combined signal is compatible with conventional single-port rendering devices. Also presented is a means for selecting among multiple video streams that minimizes the number of interconnections that are switched.

Figure 1:
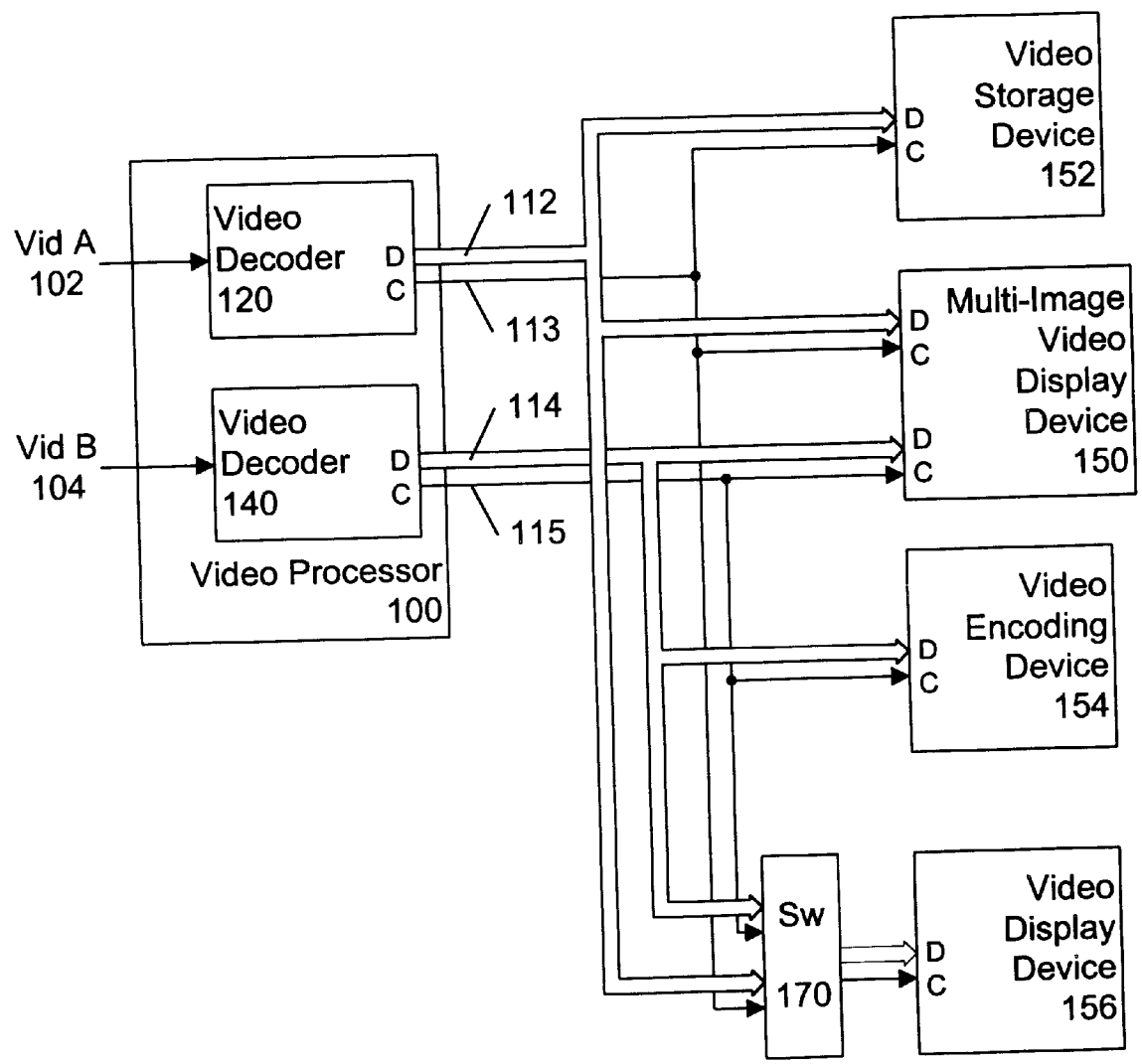
FIG. 1 illustrates a block diagram of an interconnection of video devices using a prior art technique.
Figure 2:
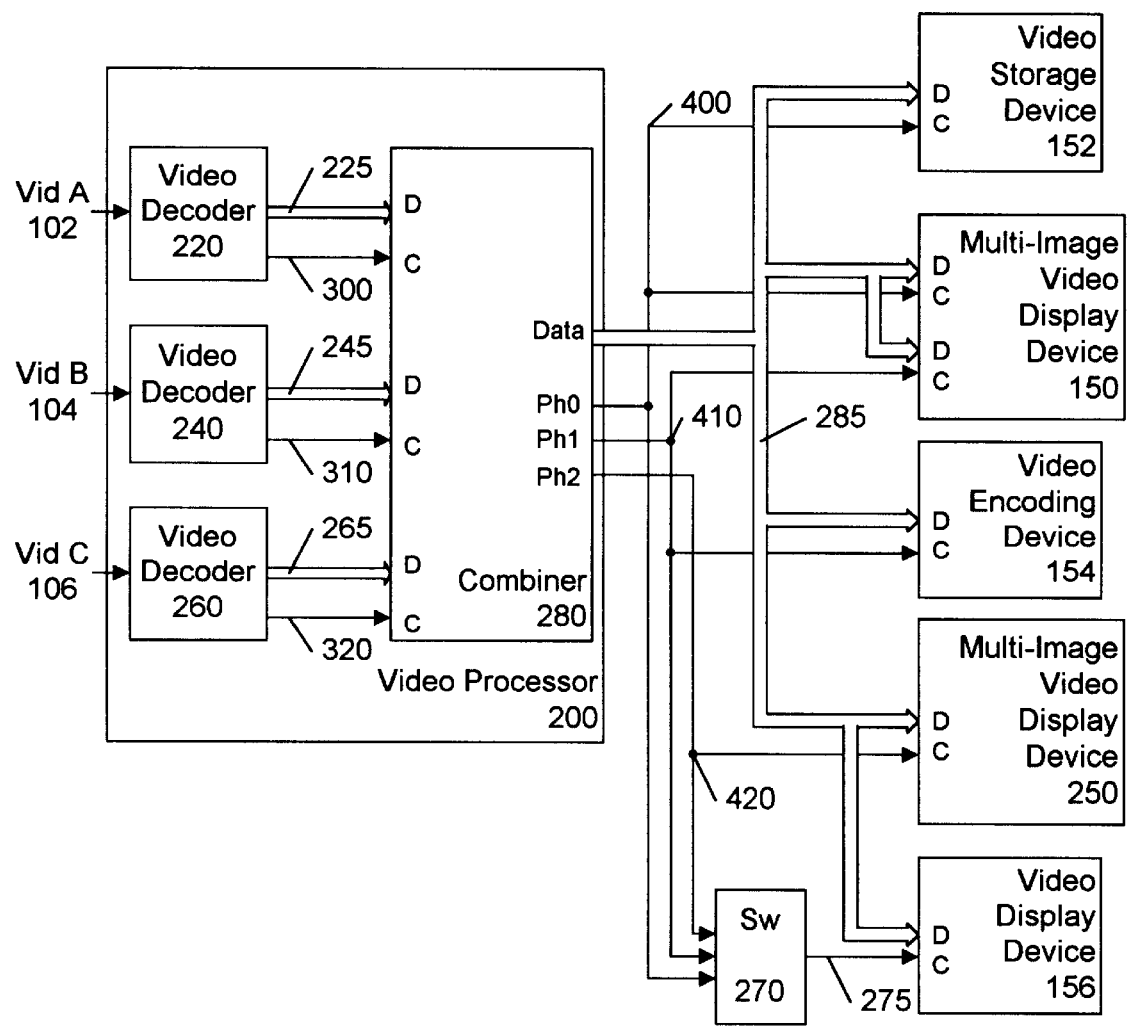
FIG. 2 illustrates a block diagram of an embodiment of an interconnection of video devices in accordance with this invention.

FIG. 2 illustrates a block diagram of a video processor 200 and video rendering devices 150, 152, 154, 156 and 250, in accordance with this invention. The video processor 200 receives inputs from three video sources, Vid A 102, Vid B 104 and Vid C 106, and produces a combined data output 285 that contains a combination of three decoded streams 225, 245 and 265 corresponding to the three video sources Vid A 102, Vid B 104 and Vid C 106. Associated with the combined data output 285 is a set of clock signals 400, 410 and 420 corresponding to three phases of a common clock signal. The combined data output 285 includes the number of data lines required for the conventional rendering devices 150, 152, 154 and 156, typically in conformance with an interconnection standard, such as ITU-R-656. In this manner, the physical interconnection of the devices in this embodiment conforms to the standard. Note that, as compared to the interconnections of FIG. 1, only one data output port 285 is required at the video processor 200, thereby reducing the pin-out requirements of the video processor 200 when implemented as an integrated circuit.

Figure 3:
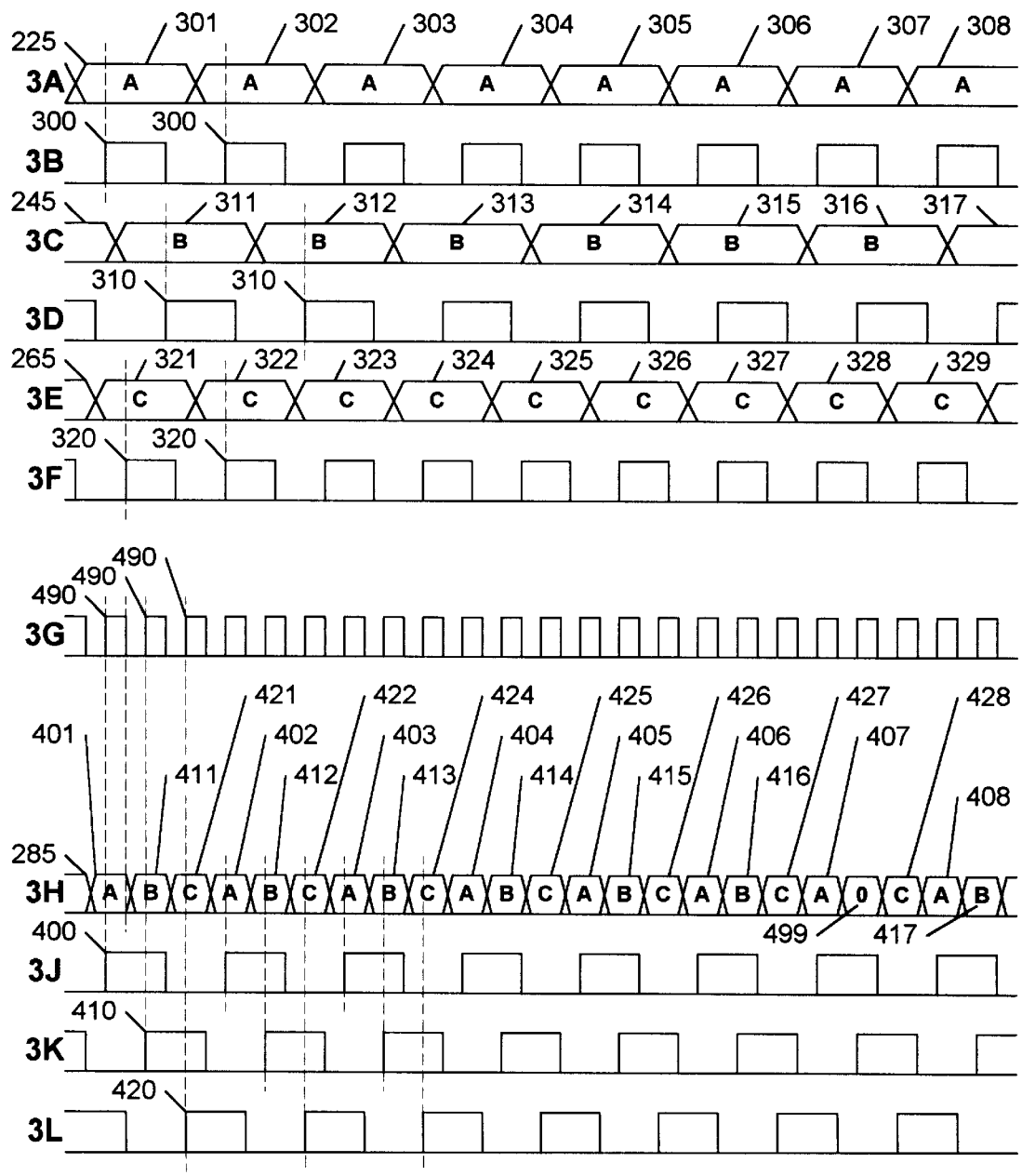
FIG. 3 illustrates a timing diagram of an embodiment of a video processor in accordance with this invention.

The timing diagram of FIG. 3 illustrates an example of the operation of the video processor 200. The decoded data 225, 245, 265, corresponding to Vid A 102, Vid B 104 and Vid C 106, is illustrated at lines 3A, 3C and 3E, respectively. As discussed, the decoded data 225, 245, 265 will typically include multiple data lines, commonly eight data lines per decoded output. The changing values of decoded data 225 are shown as data values 301, 302, . . . 308; the changing values of decoded data 245 as data values 311, 312, . . . 317; and decoded data 265 as 321, 322, . . . 329. Associated with each decoded data 225, 245, 265 is a clock signal 300, 310, 320 shown at lines 3B, 3D, and 3F, respectively. The rising edge of each clock signal 300, 310, 320 corresponds to each point in time when the corresponding data 225, 245, 265 is stable, and the data value at that time is suitable for rendering. Conventionally, a rendering device includes a set of flip-flops that latch the data value on each data line at each rising edge of the clock.

The combined data output 285 in accordance with this invention is shown on line 3H. As shown, the combined data output 285 includes changing data values 401, 411, 421, 402, etc. The changing data values 401, 402, . . . 408 correspond to the changing data values 301, 302, . . . 308 of the decoded data 225 corresponding to video source Vid A 102. The changing data values 411, 412, . . . 417 correspond to 311, 312, . . . 317; and data values 421, 422, . . . 428 correspond to 321, 322, . . . 328. The three clock signals 400, 410 and 420 that are associated with the combined data output 285 are shown at lines 3J, 3K and 3L, respectively. As shown by the dashed lines at the rising edge of clock 400, each rising edge of clock 400 corresponds to a stable data value 401, 402, . . . 408 corresponding to the decoded data 225 that corresponds to the video source Vid A 102. Similarly, each rising edge of clock 410 corresponds to a stable data value 411, 412, . . . 417 corresponding to the decoded data 245 that corresponds to the video source Vid B 104; and each rising edge of clock 420 corresponds to a stable data value 421, 422, . . . 428 corresponding to the decoded data 245 that corresponds to the video source Vid C 106. Because the conventional rendering device latches the data value on each data line at each rising edge of the clock, the selection among clock signals 410, 420, and 430 will determine whether the latched value at each rising edge corresponds to Vid A 102, Vid B 104, or Vid C 106, respectively.

Thus it is shown that by forming the combined data output 285 as illustrated in FIG. 3, the interconnection of multiple rendering devices to multiple video sources can be effected by an appropriate interconnection of clock signals, rather than specific interconnections of the multi-line decoded data ports. As shown in FIG. 2, the combined data output 285 is provided to each rendering device 150, 152, 154, 156, and 250, regardless of the particular devices' characteristics or capabilities. Note that the clock signal 275 that is provided to rendering device 156 is provided via a switch 270. The switch 270 allows for the selection of clock signal 400, 410, or 420, thereby providing a data 285 and clock 275 signal corresponding to either Vid A 102, Vid B 104, or Vid C. That is, the selection among multiple video sources is effected by the switching of a single clock line, rather than the switching of multiple data lines.

Figure 4:
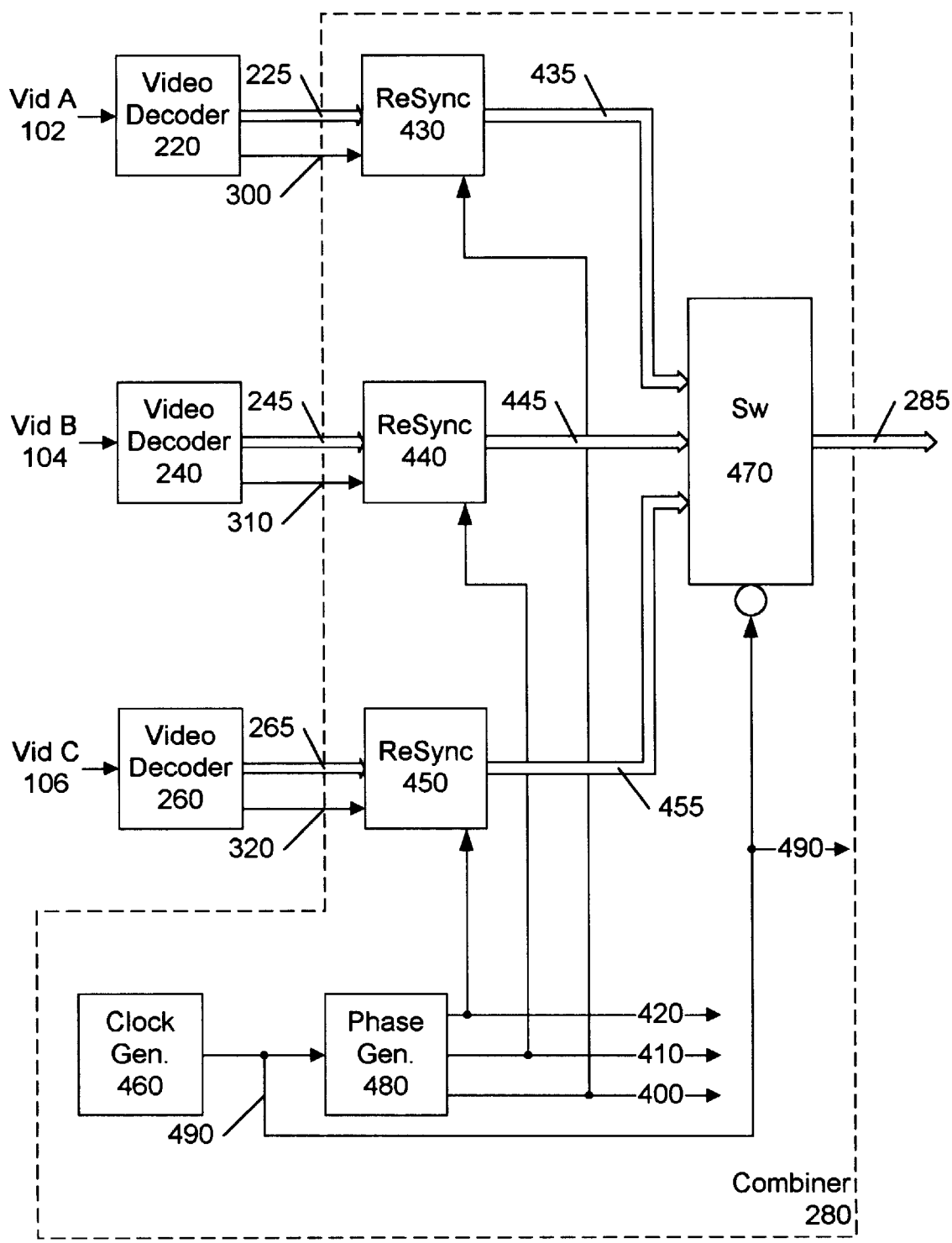
FIG. 4 illustrates a block diagram of an embodiment of a combiner circuit for combining video streams in accordance with this invention.

FIG. 4 illustrates an embodiment of a combiner 280 that produces the combined data output 285 from the decoded data 225, 245, 265. The combiner 280 includes resynchronizing buffers 430, 440, and 450, a switch 470, a clock generator 460, and a clock phase generator 480. As illustrated in FIG. 3, each decoder 220, 240, 260 may produce decoded data 225, 245, 265 at different frequencies. That is, clocks 300, 310, 320 are illustrated with different frequencies; clock 320 is the fastest, and clock 310 is the slowest. Correspondingly, within a given time period, a different number of changed data values will occur. In the time span shown in FIG. 3, there are approximately 8 data values (301–308) corresponding to Vid A 102, 7 data values (311–317) corresponding to Vid B 104, and 9 data values (321–329) corresponding to Vid C 106. The resynchronizing buffers 430, 440, 450 buffer the corresponding decoded data 225, 245, 265, and produce outputs 435, 445, and 455. The phase generator 480 provides three clock phases 400, 410, 420 of a common clock signal, at a common frequency. These three clock phases 400, 410, 420 are each provided to the resynchronizing buffers 430, 440, and 450 to produce the outputs 435, 445, and 455 at the common frequency.

Because the decoded data 225, 245, and 265 are each at a different frequency, synchronizing them to the common frequency requires either removing data, adding data, or both, to create the combined data output 285. As shown in FIG. 3, the common frequency of clock signals 400, 410, 420 is substantially equal to the frequency of the clock 300; as such, each changed data value 301, 302, . . . 308 corresponding to Vid A 102 has a corresponding data value 401, 402, . . . 408 in the combined data output 285. Because the decoded output 245 corresponding to Vid B 104 is at a lesser frequency than the common frequency, more clock cycles of clock 410 will occur than changed data values 311, 312, . . . 317. The resynchronizing buffer 440 of FIG. 4 generates a null value whenever more resynchronizing clock cycles 410 occur than input clock cycles 310. This null data value is shown in FIG. 3, line 3H, as a null data value 499 that is inserted in the combined data output 285. Alternatively, the resynchronizing buffer 440 could repeat the prior data value 416 to fill the void caused by the slower input clock frequency. Typically, the specification used for rendering will indicate whether null values or repeat values are to be used to fill voids. Similarly, resynchronizing buffer 450 skips an data value whenever more input clock cycles 320 occur than resynchronizing clock cycles 420. Note that the changed data values in the combined data output 285 in FIG. 3 includes a sequence . . . 402, 412, 422, 403, 413, 424 . . . . The data value 422 corresponds to data value 322 of decoded data 265 for Vid C 106, the data value 424 corresponds to data value 324. Note that a data value corresponding to data value 323 is not shown in the combined data output 285 in FIG. 3. That is, because the resynchronizing clock 420 is slower than the input clock 320, the resynchronizing buffer 450 skips the production of an output corresponding to data value 323. As with the addition of data values to fill voids, the specification used for rendering will typically include parameters and constraints to be used for deleting data values. For example, in conventional television broadcast systems, certain periods of time in each frame are used for synchronization; deleting data values during these time periods will have no effect on the video output.

Each of the phase-synchronized outputs 435, 445, and 455 are provided to the switch 470 that forms the combined output 285. The clock generator 460 provides a clock signal 490 that operates at three times the common resynchronizing clock frequency. The phase generator sequentially generates the phased clock signals 400, 410, 420 at each cycle of clock signal 490, as shown by the dashed lines at the rising edge of clock 490 at line 3G and each clock signal 400, 410, 420 at lines 3J, 3K, and 3L, respectively. The switch 470 is a multiplexer that sequentially selects signals 435, 445, 455 repeatedly at each cycle of clock signal 490. To avoid switching of switch 470 at the same time that the outputs 435, 445, 455 are changing, the opposite phase of clock signal 490 is used to effect the switching, as shown by the inversion symbol at the clock 490 input to switch 470. The switch 470, operating at three times the common clock frequency produces the combined data output 285 shown on line 3H of FIG. 3.

As would be evident to one of ordinary skill in the art, the resynchronizing buffer 430 is unnecessary because the frequency of the resynchronizing clock 400 is equal to the frequency of the input clock 300. Similarly, if each of the decoders 220, 240, 260 were operating at a common frequency, each of the resynchronizing buffers 420, 430, 440 could be eliminated or substantially reduced in complexity. Also, a common clock could be utilized as a resynchronizing clock for each of the resynchronizing buffers 420, 430, 440 in lieu of the individual clock phase signals 400, 410, and 420. Also, the resynchronization function of the resynchronizing buffers 420, 430, and 440 could be embodied in the switch 470. As would also be evident to one of ordinary skill in the art, the combination of fewer or more video streams can be effected using the principles of this invention by adding or deleting the appropriate number of resynchronizing buffers and increasing or decreasing the number of clock phases provided.

Figure 5:
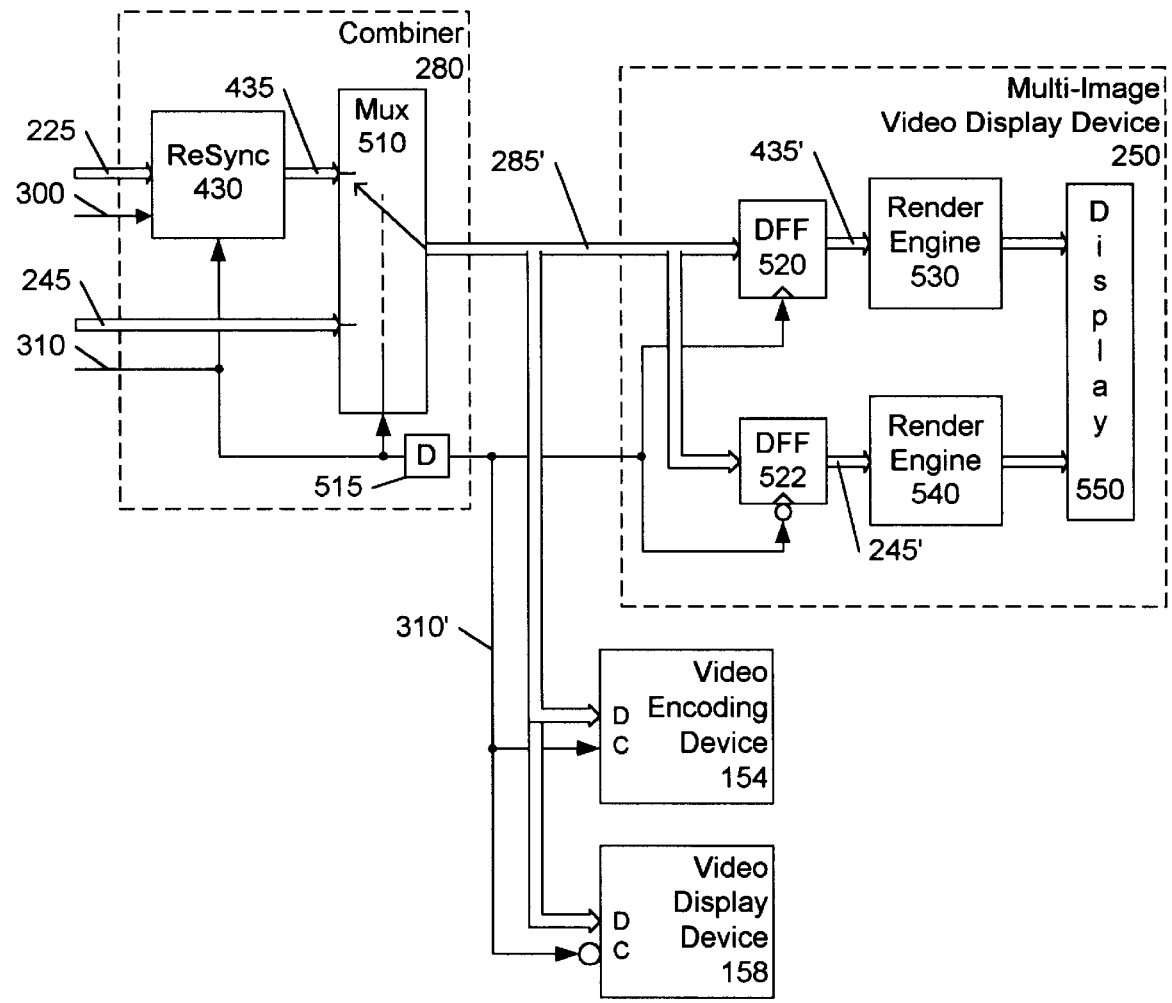
FIG. 5 illustrates a block diagram of an embodiment of a two-input combiner and associated multiimage display device in accordance with this invention.

FIG. 5 shows an embodiment of a two input combiner 280, and a corresponding embodiment of a multi-image display device 250, such as a picture-in-picture display device. In the two input combiner 280 of FIG. 5, the frequency of the decoded output 245, corresponding to Vid B 104 is used as the common resynchronizing frequency. As such, there is no need to resynchronize the decoded output 245. The decoded output 225, corresponding to Vid A 102, is resynchronized to the frequency of the decoded output 245 via the resynchronizing buffer 430, using the clock signal 310 that is associated with the decoded output 245 as the resynchronizing clock. The clock signal 310 controls a multiplexer 510, to combine the decoded output 245 with the resynchronized output 435 to produce the combined data output 285.

Figure 6:
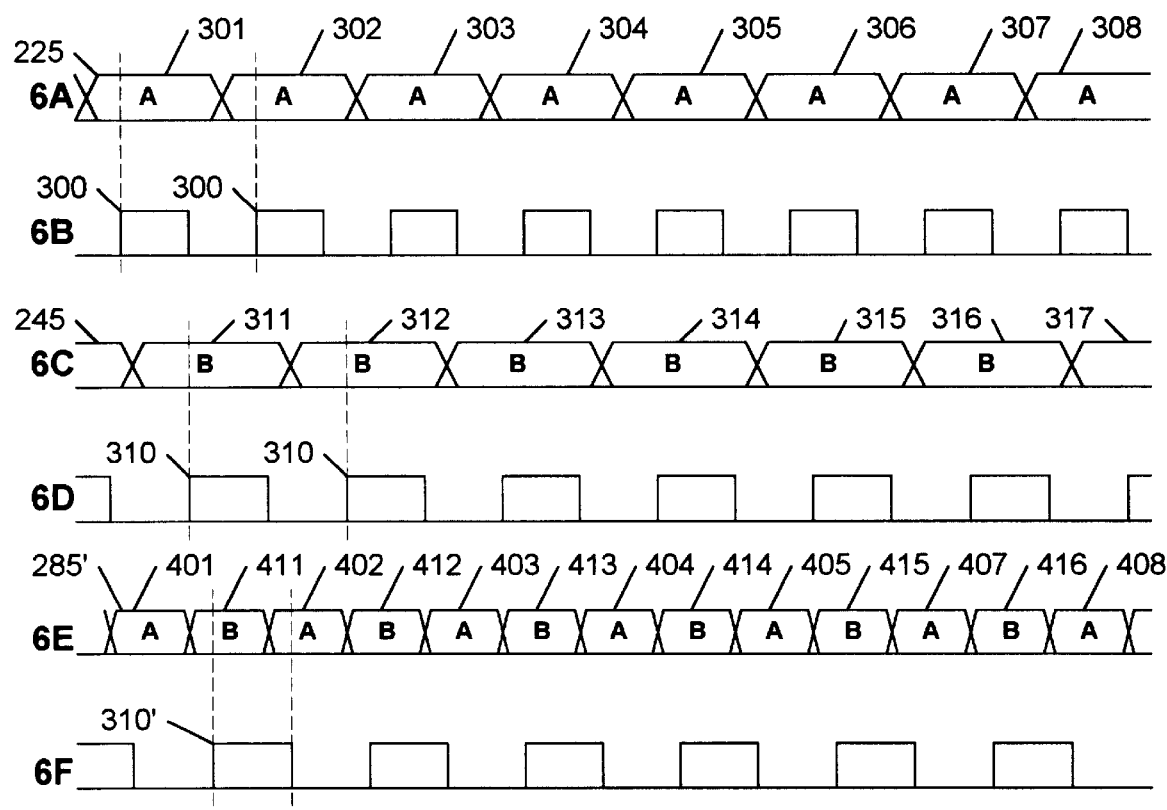
FIG. 6 illustrates a timing diagram of an embodiment of a two-input combiner in accordance with this invention.

FIG. 6 shows the timing diagram associated with the embodiment of FIG. 5. Lines 6A–6D are copies of lines 3A–3D, previously discussed. Line 6E shows the output of the multiplexer 510, as controlled by the clock signal 310. As in FIG. 3, data values 401, 402, . . . 408 correspond to data values 301, 302, . . . 308 of decoded output 225, and data values 411, 412, . . . 417 correspond to data values 311, 312, . . . 317 of decoded output 245. Note that, because the resynchronizing clock 310 is slower than the input clock 300, a data value corresponding to data value 306 is skipped in the combined output 285'.

To assure that the rendering devices do not latch the data values at the same time that the multiplexer 510 is switching, delay block 515 delays the clock signal 310 to form a delayed clock signal 310' shown on line 6F of FIG. 6. The delayed clock signal 310' is provided to each of the rendering devices 250, 154, and 156 of FIG. 5.

The multi-image video display device 250 contains two flip-flops 520, 522. DFF 520 latches the data value of the combined data output 285' on the rising edge of clock signal 310', and DFF 522 latches the data value of the combined data output 285' on the falling edge of the clock signal 310'. In this manner, the combined data output 285' is latched on alternate clock edges to form decoded outputs 435' and 245', corresponding to the decoded outputs 435 and 245 in the combiner 280'. These decoded streams 435' and 245' are provided to rendering engines 530 and 540 for subsequent display on a display 550. If, as in FIG. 2, the video display device 250 is a three-image display device, device 250 would generate a clocking signal corresponding to each of the multiple phases of the received common clock, using clock generation techniques common in the art. The generated clocking signal could be based on any one of the clock phases 400, 410, 420, and is shown in FIG. 2 as being based on clock phase 420. Alternatively, as shown in FIG. 4, the clock signal 490 that generates the individual clock phases 400, 410, 420 may be provided as an output of the combiner 280. The multi-image video display device 250 may use a phase generator, similar to the phase generator 480 of FIG. 4, to generate the desired phase within the video display device 250.

Also shown in FIG. 5 are a video encoding device 154 and a video display device 158. Because the video encoding device 154 receives the clock signal 310' directly, it will latch the data values 311, 312, etc. corresponding to the decoded data 245 from Vid B 104, as discussed above with regard to FIGS. 3 and 4. Conventionally, the video encoding device 154 contains a flip-flop similar to DFF 520, discussed above. Video display device 158 is shown having an inverted clock input, similar to DFF 522. As such, it will latch data values 301, 302, etc. on the falling edge of the clock signal 310', corresponding to the decoded data 225 from Vid A 102. Thus, both rendering devices 154 and 156 receive the same combined data output 285', and rendering device 154 renders an image corresponding to Vid B 104 while rendering device 158 renders an image corresponding to Vid A 102.

Figure 7:
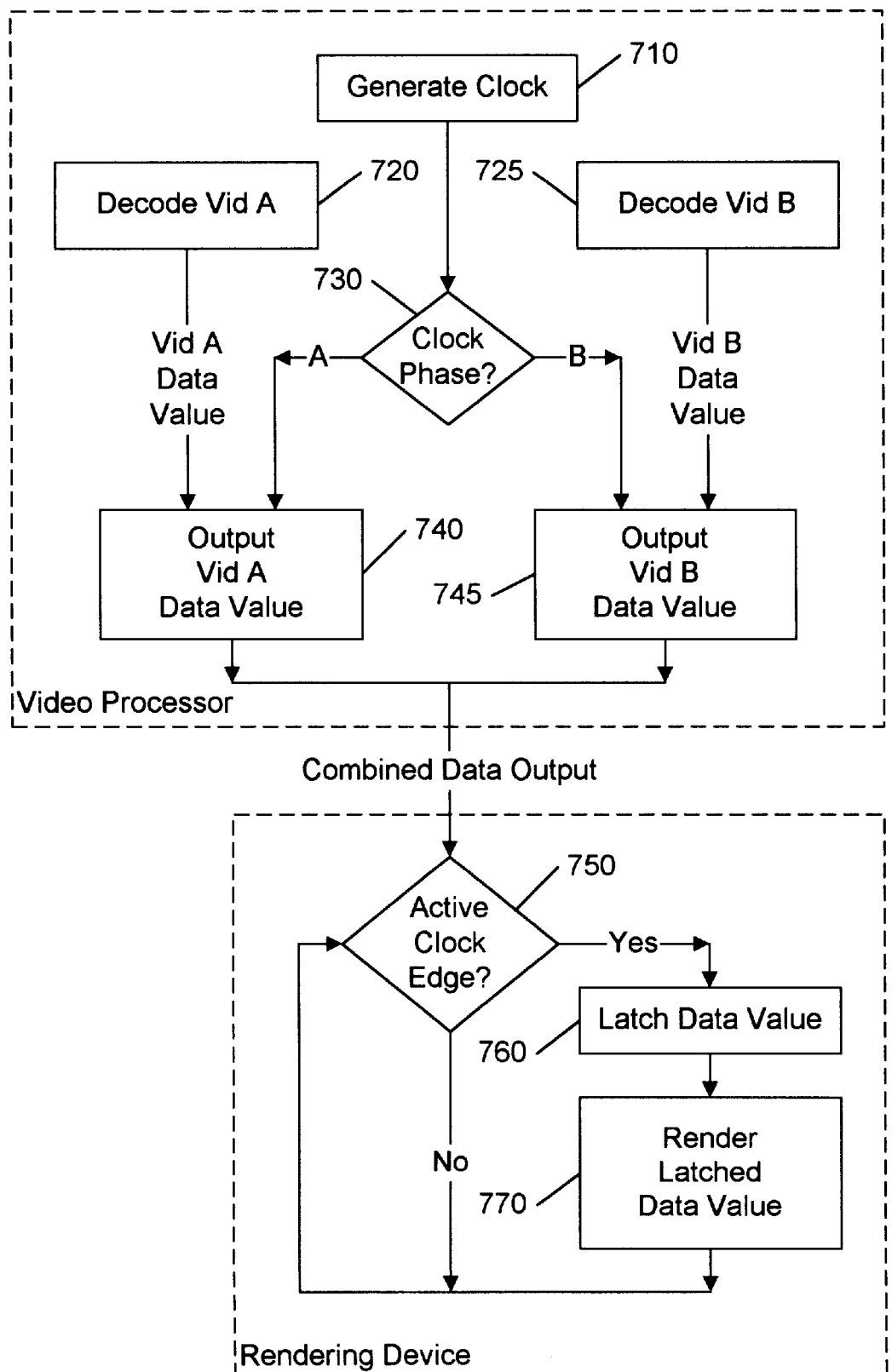
FIG. 7 illustrates a flow-chart for combining and separating video streams in accordance with this invention.

FIG. 7 shows an example flowchart for forming a combined data output in a two input video processor, and for rendering one of the two inputs in dependence upon the phase of a clock signal. A clock signal is generated, at 710, and its phase, either A or B, is tested at 730. In parallel with this clock generation, video streams A and B are decoded, at 720 and 725, respectively. If the clock phase is A, the decoded data value of video stream A is output, at 740; if the clock phase is B, the decoded value of video stream B is output, at 745. The clock is continually generated, at 710, and thus the output of the video processor is a combined data output stream. The rendering device receives this continuing combined data output stream, but does not do anything with the stream until an active edge of its clock occurs, at 750. As discussed above, the rendering device in accordance with this invention will receive a clock signal having a particular phase, such that its active edge occurs when the appropriate video source's decoded data is present at the combined data output. When the active clock edge occurs, the data value of the combined data output is latched, at 760. Thereafter, the data value of the combined data output may change without affecting the data latched at 760. This latched data is processed for rendering, at 770. The rendering device then returns to 750 to await the next active clock edge. As shown, by changing the phase of the clock used at the rendering device, the active clock edge will occur at a different time, allowing the alternative video source data to be rendered.

As shown, multiple video sources may be combined on a common data output and provided to one or more rendering devices for display or subsequent processing. Alternative embodiments of the principles presented herein would be evident to one of ordinary skill in the art. For example, by providing a means of adjusting the occurrence of the active clock edge in block 750 of FIG. 7, the rendering device could select any video stream within the combined data output. Thus, in FIG. 2, if a rendering device had a phase adjustment capability, it could be connected to any of the clock signals 400, 410, 420 and merely select the desired video stream by adjusting its phase. Each of the functions presented may be performed in hardware, software, or a combination of both. For example, the resynchronization buffers 430, 440, 450 could be hardware FIFOs, and the resynchronization process could be a software program that determines which locations in the FIFO are to be skipped or null filled. In another example, the switch 270 may contain a phase generator 480, and provide for a selection of the phases generated by the phase generator 480, using the clock signal 490 as a single input to this switch 270. The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. An apparatus comprising:
a first video decoder that produces a first decoded output that is suitable for rendering by a first rendering device,
a second video decoder that produces a second decoded output that is suitable for rendering by a second rendering device,
a combiner, operably coupled to the first and the second video decoders, that combines the first decoded output and the second decoded output to produce a combined output and a clock signal, such that the combined output is suitable for rendering by the first rendering device and the second rendering device by a selection of a phase of the clock signal.

2. The apparatus of claim 1, wherein
the first rendering device and the second rendering device are each configured to receive rendering data via N data lines, and
the combiner provides the combined output as the rendering data via the N data lines.

3. The apparatus of claim 1, wherein the combined output is suitable for rendering the first decoded output and the second decoded output via a third rendering device.

4. The apparatus of claim 4, wherein the third rendering device is a picture-in-picture rendering device.

5. The apparatus of claim 1, wherein the first rendering device is at least one of a video storage device, a video encoding device, and a video display device.

6. The apparatus of claim 1, wherein the first video decoder is at least one of an MPEG decoder, and a television signal decoder.

7. The apparatus of claim 6, wherein the second video decoder is at least one of another MPEG decoder and another television signal decoder.

8. The apparatus of claim 1, wherein the combined output is compatible with a picture-in-picture rendering device.

9. The apparatus of claim 1, wherein the clock signal includes at least two phases from which to select the phase.

10. The apparatus of claim 1, wherein the combiner includes:
a resynchronizer, operably coupled to the first video decoder, that produces a resynchronized output based on the first decoded output and the clock signal, and
a multiplexer, operably coupled to the resynchronizer, that produces the combined output based on the resynchronized output and the second decoded output.

11. The apparatus of claim 1, wherein the combiner includes
a clock generator that provides a high frequency clock signal,
a phase generator, operably coupled to the clock generator, that provides a plurality of phased clock signals based on the high frequency clock signal,
a first resynchronizer, operably coupled to the first video decoder, that produces a first resynchronized output based on the first decoded output and a first phased clock signal of the plurality of phased clock signals,
a second resynchronizer, operably coupled to the second video decoder, that produces a second resynchronized output based on the second decoded output and a second phased clock signal of the plurality of phased clock signals, and
a switch, operably coupled to the first resynchronizer, the second resynchronizer, and the clock generator, that provides the combined output based on the first and second resynchronized outputs in dependence upon the high frequency clock signal, and
wherein the selection of the phase of the clock signal is effected by a selection of one of the plurality of phased clock signals.

12. A method for combining video streams comprising the steps of:
decoding a first video signal to produce a first decoded output,
decoding a second video signal to produce a second decoded output,
combining the first decoded output and the second decoded output to produce a combined output, which includes the first decoded output and the second decoded output, and a clock signal, and
rendering at least one of the first and second decoded outputs as included in the combined output based on a phase of the clock signal.

13. The method of claim 12, wherein the step of rendering includes the steps of
producing a first plurality of samples of the combined output based on a first phase of the clock signal,
producing a second plurality of samples of the combined output based on a second phase of the clock signal,
rendering a first image based on the first plurality of samples, and
rendering a second image based on the second plurality of samples.

14. The method of claim 12, wherein the first video signal is at least one of an MPEG stream and a television signal.

15. The method of claim 12, wherein the step of combining includes:
resynchronizing the first decoded output to a frequency of the clock signal to produce a resynchronized output, and multiplexing the resynchronized output and the second decoded output to produce the combined output.

16. The method of claim 12, wherein the step of combining includes:

resynchronizing the first decoded output to a frequency of the clock signal to produce a first resynchronized output, resynchronizing the second decoded output to the frequency of the clock signal to produce a second resynchronized output, and multiplexing the first resynchronized output and the second resynchronized output to produce the combined output.

17. A video display system comprising:

a first video decoder that receives a first video stream and produces a first decoded output, a second video decoder that receives a second video stream and produces a second decoded output, a combiner, operably coupled to the first and the second video decoders, that combines the first decoded output and the second decoded output to produce a combined output and a clock signal, a renderer, operably coupled to the combiner, that receives the combined output and produces:

first image data corresponding to the first video stream when the clock signal is a first phase, and second image data corresponding to the second video stream when the clock signal is a second phase.

18. The video display system of claim 17, further including a display that displays an image based on the first and second image data.

19. The apparatus of claim 17, wherein the combiner includes:

a first resynchronizer, operably coupled to the first video decoder, that produces a first resynchronized output based on the first decoded output and the clock signal, and a multiplexer, operably coupled to the first resynchronizer, that produces the combined output based on the first resynchronized output and the second decoded output.

20. The apparatus of claim 19, wherein the combiner further includes a second resynchronizer, operably coupled to the second video decoder and to the multiplexer, that produces a second resynchronized output based on the second decoded output and the clock signal, and wherein the multiplexer produces the combined output based on the first and the second resynchronized outputs.

* * * * *